(12) United States Patent
Sann et al.

(10) Patent No.: US 10,335,721 B2
(45) Date of Patent: Jul. 2, 2019

(54) FILTER ELEMENT FOR A FILTER DEVICE

(75) Inventors: Norbert Sann, Riegelsberg (DE); Dirk Röder, Saarbrücken (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 772 days.

(21) Appl. No.: 13/261,793

(22) PCT Filed: Mar. 7, 2012

(86) PCT No.: PCT/EP2012/000998
§ 371 (c)(1),
(2), (4) Date: Mar. 7, 2014

(87) PCT Pub. No.: WO2013/007320
PCT Pub. Date: Jan. 17, 2013

(65) Prior Publication Data
US 2014/0209531 A1    Jul. 31, 2014

(30) Foreign Application Priority Data
Jul. 8, 2011  (DE) .......................... 10 2011 106 909

(51) Int. Cl.
*B01D 27/08* (2006.01)
*B01D 35/30* (2006.01)
*B01D 35/147* (2006.01)

(52) U.S. Cl.
CPC ........... *B01D 35/30* (2013.01); *B01D 35/147* (2013.01); *B01D 27/08* (2013.01);
(Continued)

(58) Field of Classification Search
CPC .................. B01D 35/30; B01D 35/147; B01D 2201/4092; B01D 2201/34;
(Continued)

(56) References Cited

U.S. PATENT DOCUMENTS 2,134,385 A * 10/1938 Winslow ............... B01D 27/02
                                                210/167.04
4,320,005 A *  3/1982 DeGraffenreid ..... B01D 17/045
                                                     210/232
(Continued)

FOREIGN PATENT DOCUMENTS

| DE | 20 2007 017614 | 4/2009 |
| DE | 20 2007 018076 | 5/2009 |
| DE | 10 2009 015094 | 10/2010 |

*Primary Examiner* — Lucas A Stelling
*Assistant Examiner* — Angel Olivera
(74) *Attorney, Agent, or Firm* — Wenderoth, Lind & Ponack, L.L.P.

(57) ABSTRACT

A filter element for a filter device has a filter housing (3; 4). The filter element (1) includes a receiving part (19) which, when the filter element (1) is located in the filter housing (3; 4) in the operational position, comes into fluid communication with a housing part (17; 18) of the filter housing (3; 4) to form a fluid connection (9). The receiving part (19) of the filter element (1) has an inner, first guiding path (37) for sealing contact to the housing part (17) of the filter housing (3) according to a first mode of construction and an outer, second guiding path (51) for sealing contact to the housing part (18) of the filter housing (4) according to a second mode of construction.

12 Claims, 2 Drawing Sheets

(52) U.S. Cl.
CPC .... *B01D 2201/291* (2013.01); *B01D 2201/34* (2013.01); *B01D 2201/4015* (2013.01); *B01D 2201/4092* (2013.01)

(58) Field of Classification Search
CPC .............. B01D 2201/291; B01D 27/08; B01D 2201/4015; B01D 46/0005; B01D 46/2422; B01D 46/2414; B01D 46/26; B01D 35/306; B01D 35/301; B01D 35/303; B01D 2271/00; B01D 2271/02; B01D 2201/4061; B01D 2201/4046; B01D 2201/40; B01D 2201/342; B01D 2201/347; B01D 2201/304; B01D 2201/29; B01D 2201/295; B01F 2265/029; C02F 2201/004; C02F 2201/006
See application file for complete search history.

(56) References Cited

U.S. PATENT DOCUMENTS

| | | | | |
|---|---|---|---|---|
| 5,685,981 | A | * | 11/1997 | Koslow ................ B01D 29/114 210/282 |
| 5,817,234 | A | * | 10/1998 | Dye ................... B01D 17/0202 210/232 |
| 2004/0149640 | A1 | * | 8/2004 | Hennes ................. B01D 29/21 210/232 |

* cited by examiner

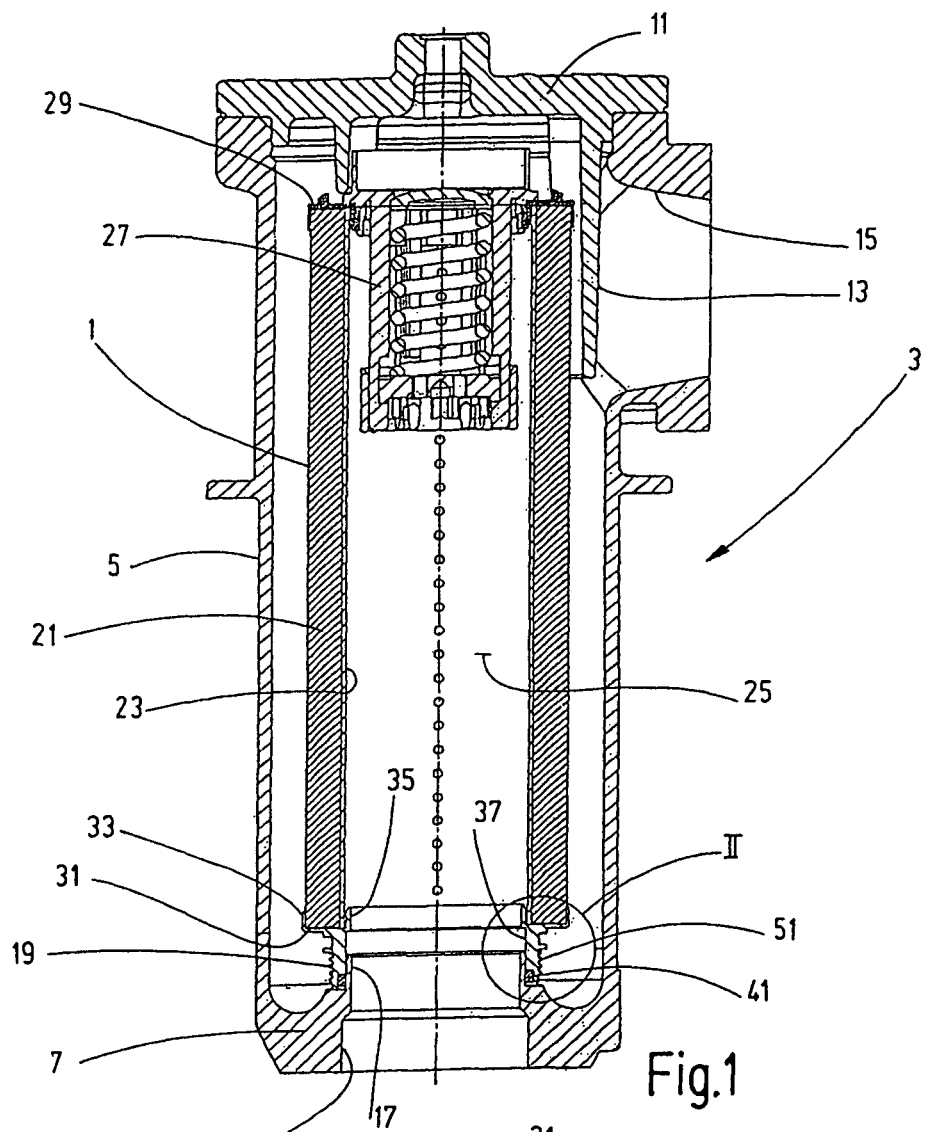
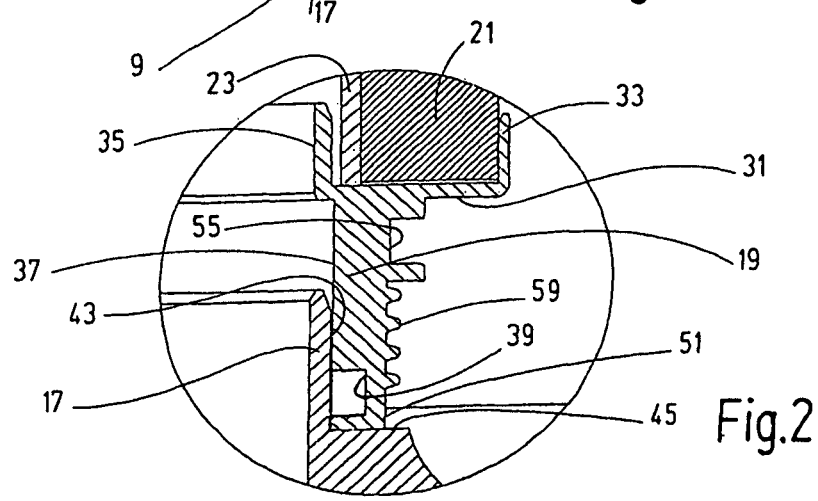

FILTER ELEMENT FOR A FILTER DEVICE

FIELD OF THE INVENTION

The invention related to a filter element for a filter apparatus having at least one filter housing. The filter element has a receiving part, which, when the filter element located in the filter housing in the operational position, comes into fluid communication with a housing part of the filter housing, forming a fluid connection. In addition, the invention relates to a filter apparatus for use with such filter elements.

BACKGROUND OF THE INVENTION

Filter elements of this kind are known from prior art. Widespread application can be found having different designs with respect to construction, size and/or pressure level in filter apparatuses for the filtration of a wide variety of technical fluids, such as hydraulic fluids, cooling lubricants, fuels, lubricating oils and the like. Since the malfunction or even breakdown of such filter apparatuses can damage or destroy downstream systems, which damage or destruction can have an economic impact, the operational reliability of the relevant filter apparatuses is of great importance. Consistent efforts have been made by the industry to refine the components relevant to the filtration process with respect to increased functional reliability. As a result, these efforts have led to the development of improved, novel filter elements with performance that is improved as compared to previously used filter elements. However, when utilizing these advantages, one is still faced with the problem of the compatibility of such improved, new filter elements with existing filter apparatuses, which are designed for use with previously conventional filter elements. In other words, to use the corresponding, newly developed filter elements, replacement of the filter housing in conventional filter apparatuses is necessary. Given the widespread use of the filter apparatuses being considered with a mode of construction of the filter housing that is common for conventional filter elements, which must be replaced with a filter housing of a modified mode of construction, the operational advantages of the improved, new filter elements are scarcely of economic benefit.

SUMMARY OF THE INVENTION

An object of the invention is to provide an improved filter element that is versatile and therefore of economic benefit.

According to the invention, this object is basically achieved by a filter element having, as an essential feature of the invention, a receiving part of the filter element having an inner, first guiding track for sealing contact with the housing part of the filter housing according to a first mode of construction, as well as an outer, second guiding track for sealing contact with the housing part of the filter housing according to a second mode of construction. The operational advantages that arise from the use of a correspondingly developed, improved filter element can be utilized not only in conjunction with filter housings at a new stage in development, but also with existing filter apparatuses having a filter housing, the mode of construction of which is adapted to previously conventional filter elements. The advantages of refined filter elements therefore do not need to be obtained through the replacement of existing filter housings.

Since the filter elements according to the invention can be operated with filter housings of a second mode of construction, improving refinements can also be utilized with the filter housing, so that substantial improvements can be realized in overall systems comprising a filter element and filter housing.

In especially advantageous exemplary embodiments, both guiding tracks of the filter element are provided in a part of an end cap, which forms the receiving part. The guiding tracks form a mounting for an associated filter medium enclosing an inner filter cavity. The fixing of the filter element by an end cap properly secures the position of the filter element in the operational position in a simple manner.

Especially advantageously, the receiving part has a pipe socket, which encloses an access opening to the inner filter cavity at the end cap, which forms the inner, first guiding track on the inner surface thereof, and which forms the outer, second guiding track on the outer surface thereof. The pipe socket not only forms both guiding tracks for interaction with the corresponding housing parts of the filter housings of different modes of construction, but also forms a reliable fluid communication between the inner filter cavity and the fluid connection of the respective housing.

In especially advantageous exemplary embodiments, the inner, first guiding track may be formed by an inner cylindrical surface of the pipe socket, which is provided on the housing part of the filter housing of the first mode of construction for contact with an outer cylindrical surface of a socket.

In order to achieve an especially high degree of operational reliability, the arrangement can be such that an external thread is formed on the outer, second guiding track, and an internal thread, which is provided for interaction with the external thread, is formed on a contact surface on the inner surface of a socket of the housing part of the filter housing of the second mode of construction. Because the filter element in is screwed into the operational position in the housing in this manner, the stability of the position of the filter element can be ensured.

To seal the guiding tracks at the respective socket of the filter housings of the first mode of construction or of the second mode of construction, the pipe socket on the inner, first guiding track can have a first sealing element, which is disposed at the end part of this guiding track at a spacing from the end cap, and can have a second sealing element on the outer, second guiding track, which is disposed at the initial part of the second guiding track adjacent to at the end cap.

The object of the invention is also a filter apparatus, which is provided for use with filter elements according to the invention.

The first mode of construction of the filter housing may be conventional filter apparatuses currently in use. The second mode of construction of the filter housing only allows the use of filter elements according to the invention, in which, in addition to an inner, first guiding track, provided to interact with the fluid connection of conventional filter housings, an outer, second guiding track is provided for the refined second housing design.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 1 is a simplified, schematic side view in section of a filter apparatus according to an exemplary embodiment of the invention, with a filter element according to the invention and a filter housing corresponds to a first mode of construction;

FIG. 2 is an enlarged side view in section of the region II in FIG. 1;

DETAILED DESCRIPTION OF THE INVENTION

Figure 3:
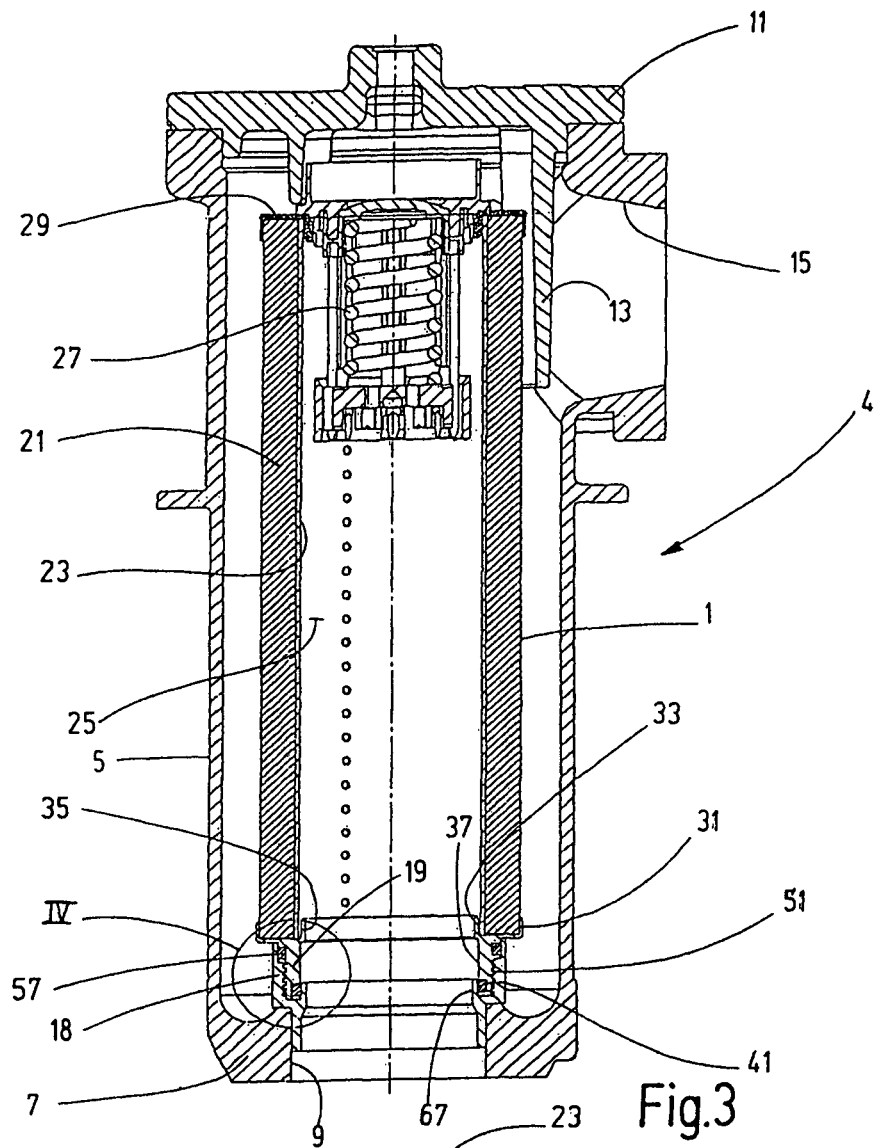
FIG. 3 is a simplified, schematic side view in section of the filter element of FIG. 1 accommodated in a filter housing of a second mode of construction.

FIGS. 1 and 2 show an exemplary embodiment of the invention, wherein a filter element 1 according to the invention is accommodated in a filter housing 3, which corresponds to a conventional mode of construction as is widely used in the art. The filter housing 3 has a main housing body 5, which by and large defines a hollow, cylindrically-shaped inner space for receiving the filter element 1. At the bottom 7, the housing 3 is closed with the exception of a central outflow opening 9, out of which, fluid cleaned during operation can be discharged. The upper, open end of the main housing body 5 is closed by a removable housing cover 11 in the usual manner for such apparatuses. This housing cover has an axial extension 13, which forms a partial cover for an inflow opening 15. The extension 13 then forms a deflector plate to protect the filter element 1 from the flow of non-filtered fluids.

The housing part, which surrounds the outflow opening 9 in the bottom 7, forms the fluid connection for releasing the filtrate and has the form of a housing socket 17 projecting in the direction of the filter element 1, i.e. projecting upward. Housing socket 17, in conjunction with a receiving part of the filter element 1, which has the form of a pipe socket 19, serves as a seat for an element, to which the filter element 1 is affixed in an operational position forming a seal. FIGS. 1 and 2 show the filter element 1 in this operational position, in which the filter element 1 is secured by the closed housing cover 11. As is usual in filter elements 1 of this kind, this filter element has a filter medium 21, which encompasses a fluid-permeable supporting tube 23 in the form of a hollow cylinder. During the filtration process, non-filtered fluids enter via the inflow opening 15 and flows through the filter medium 21 from the outside inward. Inner filter cavity 25 is enclosed by the supporting tube 23 that forms the clean side. A valve insert 27 belongs to the housing cover 11. In combination with an end cap 29 housing cover 11 seals the inner filter cavity 25 at the upper end and forms a pressure-operated bypass device in a known manner. The bypass device forms a bypass by which the non-filtered fluids can reach the inner filter cavity 25 from the inflow opening 15.

As FIG. 2 more clearly shows, the pipe socket 19 serving as a receiving part of the filter element 1 is integrally formed on the lower end cap 31 of the filter element 1. The end cap forms an outer mounting 33 for the end region of the filter medium 21. In addition to the supporting tube 23 abutting the inner surface of the filter medium 21, a short inner tube 35 projecting axially into the filter cavity 25 is located at the end cap 31. The inner surface of short tube 35 is aligned with the inner surface of the socket 17 when the filter element 1 is in the operational position.

For the pipe socket 19 forming the receiving part to interact with the housing 1 in the first mode of construction shown in FIGS. 1 and 2, the pipe socket 19 forms an inner, first guiding track 37 in the form of a smooth cylindrical surface on the inner surface thereof (see FIG. 2). That cylindrical surface is only interrupted by an annular groove 39 in the vicinity of the free, lower end for a sealing element 41 only shown in FIG. 1. In the case of the operational position, the inner, first guiding track 37, in conjunction with the sealing element 41, forms a sealed contact with the outer cylindrical surface 43 of the socket 17 (see FIG. 2). As this Figure clearly shows, the cylindrical surface 43 of the socket 17 has a step 45 at the end thereof. Step 45 is abutted by the end of the pipe socket 19 when the filter element is in the operational position.

Figure 4:
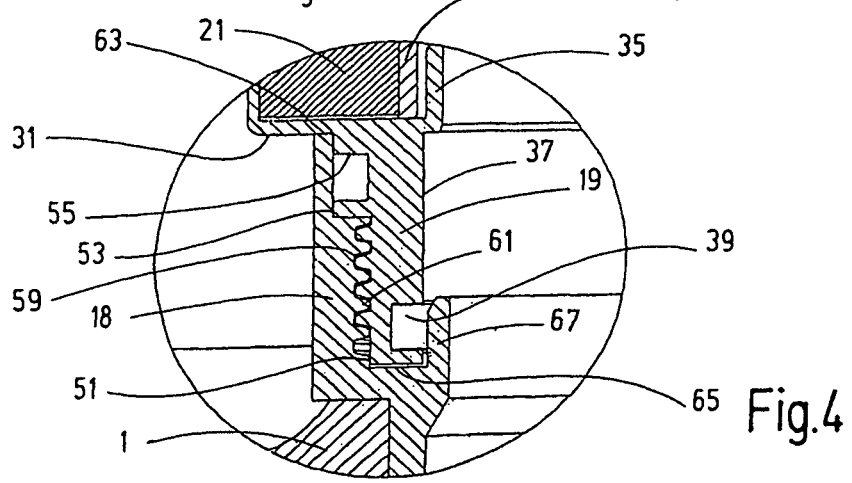
FIG. 4 is an enlarged side view in section of the region IV in FIG. 3.

FIGS. 3 and 4 show that the filter element 1 according to the invention can also be operated in conjunction with a filter housing 4 of a second mode of construction. This filter housing 4 differs from the first mode of construction in that the socket 18 interacting with the receiving part, i.e. with the pipe socket 19, of the filter element 1 is modified in such a way that that socket ensures improved stability of the position of the filter element 1 by the formation of a threaded connection. For this purpose, in addition to the inner guiding track 37, the pipe socket 19 has an outer, second guiding track 51. Second guiding track 51 is provided for the sealing contact on the inner cylindrical surface 53 of the socket 18 of the filter housing 4 of the second mode of construction. An annular groove 55 is provided on the pipe socket 19 of the element seat 31 for a sealing element 57 (see FIG. 3). This annular groove 55 is located at the initial part of the pipe socket 19 adjacent to the end cap 31. Following this annular groove 55, the pipe socket 19 is provided with an external thread 59, which can be screwed together with an internal thread 61 on the inner surface of the socket 18 (see FIG. 4).

In the case of the operational position shown in FIGS. 3 and 4, the end 63 of the socket 18 abuts the end cap 31. The free end of the pipe socket 19 rests on the bottom 65 of an annular space. The annular space is defined between an inner ring 67 of the socket 18 and the inner cylindrical surface 53 of the socket 18, and into which the pipe socket 19 extends when in the operational position. The sealing ring 41 held in the annular groove 39 of the pipe socket 19, thereby forms an additional seal vis-à-vis the socket 18 of the filter housing 4 according to a second mode of construction.

While one embodiment has been chosen to illustrate the invention, it will be understood by those skilled in the art that various changes and modifications can be made therein without departing from the scope of the invention as defined in the claims.

The invention claimed is:

1. A filter, comprising:
    a filter element received in a filter housing and having an axially extending receiving part on said filter element;
    said axially extending receiving part having first and second guiding tracks extending on respective axially extending inner and outer surfaces of said receiving part;
    the inner surface comprising a cylindrical surface having an annular groove for receiving a sealing ring; and the outer surface including a threaded surface;
    wherein said filter element is capable of being received in the filter housing in either a first or second mode of construction by engaging with a housing socket; whereby in the first mode of construction the axially extending receiving part forms a sealing connection between an outer surface of the housing socket and the inner surface of the receiving part; and whereby in the second mode of construction the axially extending receiving part forms a sealing connection between an inner surface of the housing socket and the outer surface of the receiving part.

2. The filter according to claim 1 wherein
said receiving part is on an end cap of said filter element, said first and second guiding tracks having a mounting supporting a filter medium of said filter element enclosing an inner filter cavity of said filter element.

3. The filter according to claim 2 wherein
said receiving part comprises a pipe socket enclosing an access opening to said inner cavity of said filter element at said end cap.

4. The filter according to claim 3 wherein the annular groove for receiving a sealing ring is spaced from said end cap and said outer surface comprises a second annular groove for receiving a sealing ring at a part thereof adjacent said end cap.

5. The filter according to claim 3 wherein
said housing socket of said second mode of construction comprises an inner ring delimiting an annular space on said inner cylindrical surface of said housing socket, said annular space receiving said pipe socket in the operational position with a sealing element on said inner surface of said pipe socket abutting outer surface of inner ring.

6. The filter according to claim 3 wherein
said housing socket of said first mode of construction comprises a step on said outer cylindrical surface of said first mode of construction of said housing socket, said step abutting a free end of said pipe socket in the operational position of said filter element in said filter housing.

7. The filter according to claim 2 wherein
a free end of said housing socket of said second mode of construction abuts said end cap in the operational position of said filter element in said filter housing.

8. A filter comprising:
a filter element received in a filter housing having a pipe socket being on an end cap of said filter element and having an access opening in fluid communication with an inner cavity of said filter element;
said pipe socket having an inner cylindrical surface having an annular groove for receiving a sealing ring; and having an external thread on an outer surface of said pipe socket
wherein said pipe socket is capable of being received in the filter housing in either a first or second mode of construction by engaging with a housing socket; whereby in the first mode of construction the pipe socket forms a sealing connection between an outer cylindrical surface of the housing socket and the inner cylindrical surface of the pipe socket; and in the second mode of construction the pipe socket forms a sealing, threaded connection between an internal thread of the housing socket and the external thread of the pipe socket.

9. The filter according to claim 8 wherein the annular groove for receiving a sealing ring is remote from said end cap; and said outer surface of the pipe socket comprises a second annular groove for receiving an sealing ring adjacent said end cap.

10. The filter according to claim 8 wherein said housing socket of said second mode of construction comprises an inner ring delimiting an annular space on said inner cylindrical surface of said housing socket, said annular space receiving said pipe socket in the operational position with the annular groove for receiving a sealing ring of said inner surface of said pipe socket abutting outer surface of inner ring.

11. The filter according to claim 8 wherein
said housing socket of said first mode of construction comprises a step on said outer cylindrical surface thereof, said step abutting a free end of said pipe socket in the operational position of said filter element in said filter housing.

12. The filter according to claim 8 wherein
a free end of said housing socket of said second mode of construction abuts said end cap in the operational position of said filter element in said filter housing.

* * * * *